(12) United States Patent
Martin

(10) Patent No.: US 7,139,913 B2
(45) Date of Patent: Nov. 21, 2006

(54) METHOD AND DEVICE FOR THE PREVENTION OF DISPARITIES OR ERROR MESSAGES AND FALSE RESPONSES IN IFF TYPE SYSTEMS

(75) Inventor: Jean-Claude Martin, Marnes la Coquette (FR)

(73) Assignee: Thales, Paris (FR)

( * ) Notice: Subject to any disclaimer, the term of this patent is extended or adjusted under 35 U.S.C. 154(b) by 798 days.

(21) Appl. No.: 10/190,662

(22) Filed: Jul. 9, 2002

(65) Prior Publication Data
US 2003/0028769 A1    Feb. 6, 2003

(30) Foreign Application Priority Data
Jul. 10, 2001    (FR) .................... 01 09162

(51) Int. Cl.
*H04L 9/00*    (2006.01)
(52) U.S. Cl. ............... 713/170; 713/160; 726/1; 726/22; 726/26
(58) Field of Classification Search ............... 713/170, 713/160; 726/1, 26, 22
See application file for complete search history.

(56) References Cited

U.S. PATENT DOCUMENTS 3,277,466 A * 10/1966 Gardner .................... 342/45
3,949,397 A * 4/1976 Wagner et al. ............. 342/45
5,822,430 A * 10/1998 Doud ....................... 380/260

FOREIGN PATENT DOCUMENTS

FR    2 632 421    12/1989

* cited by examiner

*Primary Examiner*—Ayaz Sheikh
*Assistant Examiner*—Trang Doan
(74) *Attorney, Agent, or Firm*—Oblon, Spivak, McClelland, Maier & Neustadt, P.C.

(57) ABSTRACT

A method and device to prevent the creation of disparities in an interrogation-response system programmed in a first mode, the Mode 4 (M4) and interrogated in a second mode, a National Mode (NM), initially having a same message structure but a different enciphering key, the format of the message being constituted by a header followed by an information block separated by a time interval T. The method comprises at least one step in which the time interval T between the end of the header and the beginning of the information block is modified into a time interval Ti different from T.

14 Claims, 3 Drawing Sheets

METHOD AND DEVICE FOR THE PREVENTION OF DISPARITIES OR ERROR MESSAGES AND FALSE RESPONSES IN IFF TYPE SYSTEMS

BACKGROUND OF THE INVENTION

1. Field of the Invention

The present invention relates to a method and device for the prevention of disparities or error messages and false responses in IFF (Identification Friend or Foe) type systems.

The invention can be applied especially in IFF identification systems used in the field of military aviation working for example in Mode 4 which is an encrypted interrogation/response mode whose waveform is described in the NATO standardization agreement, STANAG 4193.

Hereinafter in the description, the expression "National Mode" (or "National Secure Mode") designates an encrypted interrogation/response mode used in national systems of IFF type question-and-answer identification. The waveform of the National Mode has a structure identical to that of Mode 4, but makes use of different enciphering algorithms for encryption.

2. Description of the Prior Art

It may be recalled that, in IFF systems, if the interrogation is done in National Mode, only responders capable of understanding the National Mode will respond. Similarly, if the interrogation is done in Mode 4, then only responders capable of understanding the Mode 4 will respond.

An interrogator chooses to make an interrogation in Mode 4 or in National Mode. A responder does not know in which mode it will be interrogated. Several situations may then arise:

if the responder is equipped only for Mode 4, it will be able to respond only to Mode 4 interrogations, assuming that it has the right keys for decryption, when the responder is equipped only for a National Mode, it can respond only to interrogations in the National Mode, again if it has the right keys.

The configuration of current systems may give rise to problems of message recognition and false alarms in operation. For example, when an aircraft equipped with a Mode 4 responder is interrogated by an interrogator using a <<National Mode>>, it often happens that a sound alarm is triggered to warn the pilot of a "disparity". This disparity is the fact that the interrogation received has the right format but cannot be decoded by the Mode 4 algorithms. The triggering of the sound alarms is described for example in the STANAG 4193.

In certain cases, a "false" response is sent out because the interrogation is decrypted by the Mode 4 algorithms, but its contents are different from those encrypted in National Mode.

The object of the invention relies on a novel approach which gives especially the following results: a responder in National Mode (NM or NSM) does not respond to Mode 4 (M4) interrogations and is not disturbed by a sound alarm. Similarly, a Mode 4 responder does not respond to National Mode interrogations and is not disturbed by a sound alarm when it is interrogated in National Mode.

SUMMARY OF THE INVENTION

This approach can be applied in any interrogation-response system comprising two modes with a same message structure but different encryption keys.

In fact, the two modes implemented in the interrogator-responder system are unaware of each other and do not disturb each other, in effect avoiding any sound alarms and false responses.

The method and the system that are the object of the present invention especially have the function of modifying the structure of the interrogation message, especially the time interval between the header and the block containing the information, so that it is not known to a responder that is not concerned.

The invention relates to a method to prevent the creation of disparities in an interrogation-response system programmed in a first mode, a National Mode (NM) and interrogated in a second mode, a National Mode (NM), initially having a same message structure but a different enciphering key, the format of the message being constituted by a header followed by an information block separated by a time interval T, the method comprising at least one step in which the time interval T between the end of the header and the beginning of the information block is modified into a time interval Ti different from T.

The initial time interval T is for example increased, Ti being greater than T. Or else, according to another variant, it is reduced, Ti being smaller than T.

The method comprises for example a step for the dynamic management of the values of Ti so that several NM modes can be programmed.

One of the national modes is, for example, the Mode 4.

The invention also relates to a device to prevent the generation of disparities in an IFF type system comprising at least one interrogator and at least one responder, both being provided with a cryptography computer programmed in a first mode, a National Mode, the messages exchanged between an interrogator and a responder having a structure consisting of a header and a block containing pieces of information, separated by a time interval T wherein:

an interrogator in National Mode (NM) comprises at least one interface positioned between the interrogator and the cryptographic computer, the interface being adapted to modifying the initial time interval T into a time interval Ti, a responder in National Mode (NM) comprises at least one interface positioned between the interrogator and the cryptographic computer, the interface being adapted to modifying the time interval Ti of the received signal.

The interface may be a software function integrated into a processor or, again, it may be made in the form of a delay line positioned between the responder or the interrogator and the cryptographic computer.

An interface may be adapted to the management and generation of several values of time intervals Ti, the values being chosen as a function of the desired NM mode.

The different values of time intervals Ti are generated simultaneously and the responders equipped with specific interfaces respond solely to a given interrogation mode.

The present invention has especially the following advantages:

it prevents the creation of "disparities" or error messages and/or false responses when a responder is interrogated in a mode different from the one for which it is programmed.

the fixed value of the time interval T (delay or advance) mentioned here above enables the creation of the different channels for different systems or national modes. Several systems may thus work simultaneously, according to different modes, without generating disparities with sound alarms or false responses with the systems present in the neighborhood.

through a dynamic management of the time intervals T, the encoding possibilities are increased. It is possible to associate one type of interrogation with each time interval. For a same system, it is possible to make simultaneous use of several delays T and increase the enciphering possibilities.

an interrogator may interrogate responders of different systems by modifying the value of the time interval T.

the existing cryptographic computers can be kept and only the interfaces between the cryptographic computer and the national interrogator/responder units are modified a responder may be equipped with several cryptographic computers with different encryption modes without disturbance between computers.

no disparity and false response is sent out by computers that are not in interrogation mode.

BRIEF DESCRIPTION OF THE DRAWINGS

Other features and advantages of the method and device according to the invention shall appear from the following description, given by way of an illustration that is in no way restrictive, along with the appended figures, of which.

MORE DETAILED DESCRIPTION

Figure 1:
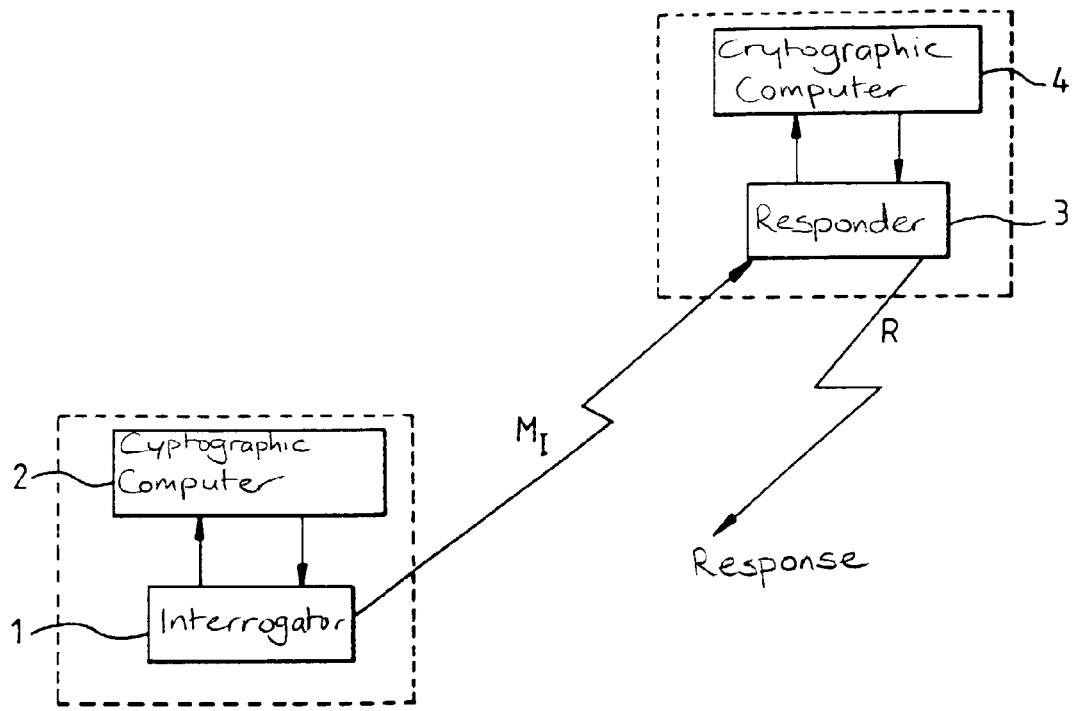
FIG. 1 shows a structure of an exchange of messages in a prior art IFF system.

FIG. 1 recalls the principle of Mode 4 interrogation-response for a responder equipped for Mode 4 operation. An IFF system comprising an interrogator 1 associated with a cryptography computer 2, interrogates a responder 3 in sending out a message $M_I$ whose format or structure is recalled in FIG. 2. The responder 3 forwards the interrogation message $M_I$ to the cryptography computer 4 with which it is connected. The cryptography computer 4 determines whether it is being interrogated in Mode 4 with the right keys or not. In the event of a valid interrogation, it transmits a response message R to the interrogator at the end of a period of time. In the other cases, namely if it is interrogated in Mode 4 with the wrong keys or if it is interrogated in National Mode, a disparity is detected and an alarm is created. The response message takes the form of three pulses spaced out at intervals of 1.75 µs sent out at a time interval chosen from among 16 possibilities.

Examples of the architecture of IFF systems can be found in Michael C. Stevens, "Secondary Surveillance Radar," Artech House, Boston, 1988.

Figure 2:
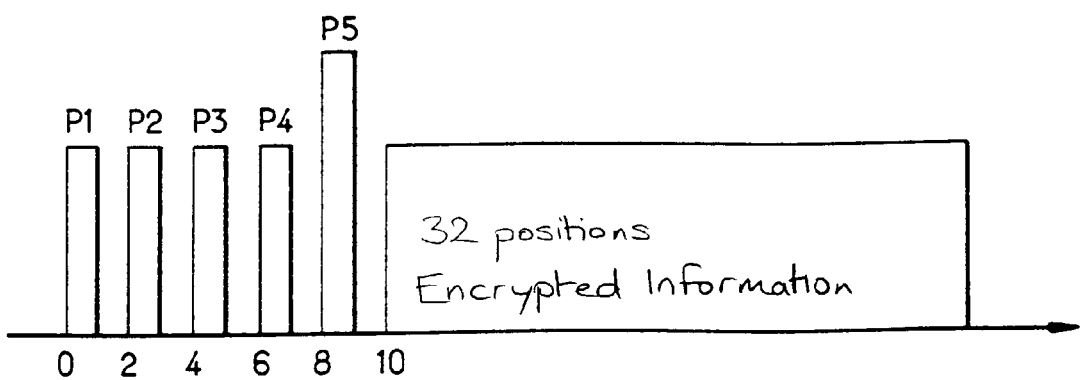
FIG. 2 shows the structure of an interrogation message in Mode 4 and National Mode without modification according to the invention.

FIG. 2 gives a diagrammatic view of the format or structure of the interrogation message $M_I$ in Mode 4. This message is formed by a group of four pulses $P_1$, $P_2$, $P_3$ and $P_4$, followed by an interrogation sidelobe suppression (ISLS) control pulse $P_5$ and a group of information pulses consisting of 32 positions that may or may not be occupied by a pulse. All the pulses and positions are spaced out by 2 µs and each pulse lasts 0.5 µs.

The information group starts 10 µs after the first pulse $P_1$. In this group of 32 possible pulses, when positions of contiguous pulses are free, then anti-interference pulses (AII) are introduced at positions corresponding to odd-parity multiples of one microsecond. The first of these pulses may be positioned at 9 µs from $P_1$.

Owing to the structure of the information contained in the information group, when a responder in National Mode is interrogated in Mode 4 and, conversely, when a responder in Mode 4 is interrogated in National Mode, there is a defined probability p of having a disparity that triggers a sound signal and a probability q that it will respond with a false response.

The idea of the invention consists in modifying the structure of the interrogation message while, at the same time, preserving the two main characteristics which are the header followed by the interrogation sidelobe suppression control pulse and the information block capable of containing up to 32 pulses. For this purpose, the method modifies the time interval T between the last synchronization pulse $P_4$ and the first pulse of the information group or block in order to generate a different message structure for interrogation in National Mode. If T designates the time interval for Mode 4, the idea is to define a time interval Ti different from T that is equal to 4±0,1 µs. The values of T are, for example, quantified to provide for a tolerance value of about 0.1 µs.

In the systems concerned by the invention, an interrogator chooses to interrogate in Mode 4 or in National Mode. This is also the case for a responder that is adapted to operation in Mode 4 or in National Mode only, or else in several modes simultaneously.

In the IFF system according to the invention, for example, the interfaces between interrogator/responder units and the cryptographic computer are modified for the National Mode. Thus the system comprises, for example, the following elements:

On the Interrogator Side

Interrogation in Mode 4

There is no modification of structure with respect to existing devices.

Interrogation in National Mode

Figure 3A:
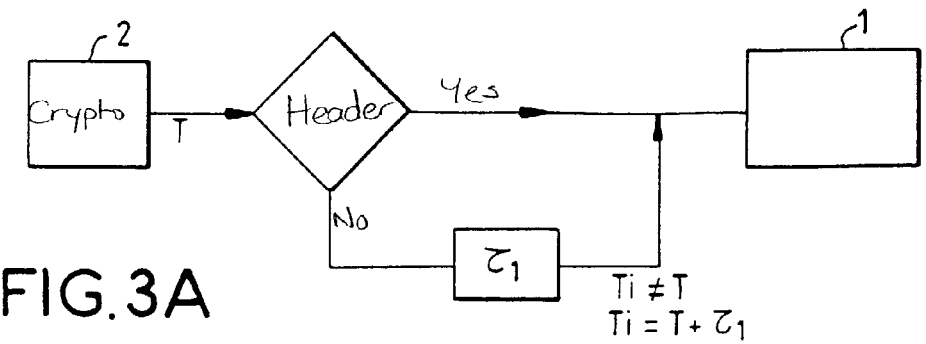
FIGS. 3A and 3B show a first exemplary interrogator and responder programmed in a National Mode according to the invention.
Figure 4A:
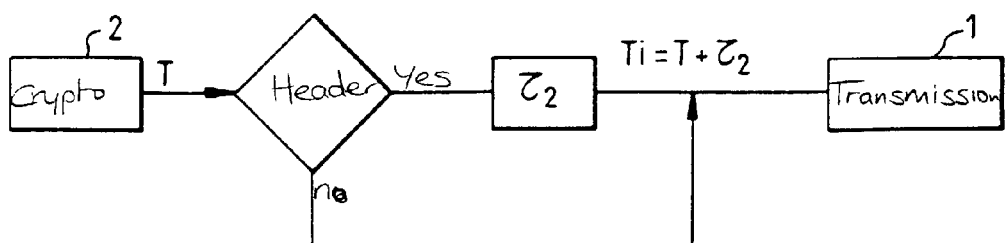
FIGS. 4A and 4B show a second alternative embodiment of a system comprising an interrogator and the responder, programmed in National Mode.

The interrogator has an interface, two examples of which are given in FIGS. 3A and 4A, enabling a time interval Ti to be defined, between the last synchronization pulse $P_4$ and the start of the message block, that is different from the Mode 4 time interval T.

On the Responder Side

Mode 4 Equipped Responder

There is no structural modification In the case of a Mode 4 equipped responder, the message is sent to the cryptography computer without modification. If it is a message in Mode 4, it is deciphered by the cryptographic computer. If it is a message in National Mode, then it is rejected owing to the difference in structure, namely the difference in the time interval Ti introduced at the transmitter.

Responder equipped for a National Mode

The responder equipped for a National Mode comprises an interface whose function, especially, is to modify the initial time interval Ti of the National Mode into a time interval T which is the Mode 4 time interval. This is done before transmitting the received interrogation message to the cryptographic computer.

Figure 3B:
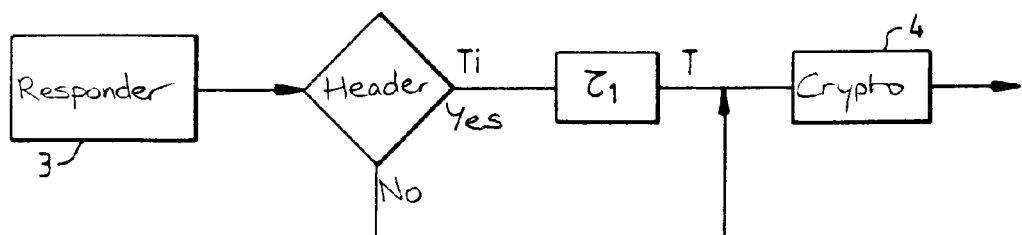

FIGS. 3A and 3B give a diagrammatic view of a first exemplary structure of an interrogator emitting in National Mode and a National Mode responder equipped with an interface according to the invention, enabling the time interval Ti to be increased.

The interrogator shown schematically in FIG. 3A comprises a cryptography computer connected to a device for sending a message by means of an interface whose function is to increase the value of the initial time interval T to a value Ti defined according to the desired National Mode.

The interface can be made in the form of software or hardware.

The interrogator sends the cryptographic computer an interrogation request $M_1$ and receives the four synchronization pulses from the computer followed by the block of 32 information pulses.

Between the reception of the pulses from the computer and the transmission, the method according to the invention introduces a delay $\tau 1$ such that $Ti=T+\tau 1>T$. It introduces this delay as follows:

If the pulses belong to the header of the message, they are transmitted directly to the sender part, If the pulses belong to the information block, the method introduces the delay $\tau 1$.

The structure of the message $M_1$ differs from that of FIG. 2 in the time interval $T_1 > T$. In the case of Mode 4, the value of $T_i$ is chosen to be greater than 4 µs.

The delay $\tau 1$ is produced either by a software function integrated into an existing processor or by means of a delay line or shift registers according to a scheme known to those skilled in the art.

The responder of FIG. 3B comprises an interface positioned between the responder and the cryptographic computer.

The interrogation message received by the responder passes into the receiver part of the responder and then into the interface which modifies its structure as follows:

The pulses forming part of the header of the message are delayed by $\tau 1$ equal to the delay introduced in the interrogator for the information bloc, The pulses representing information are sent directly to the cryptographic computer.

These operations are performed either by means of a processor or by using hardware, namely a delay line positioned between the responder part and the cryptographic computer, this delay line observing the passage of useful information.

Figure 4B:
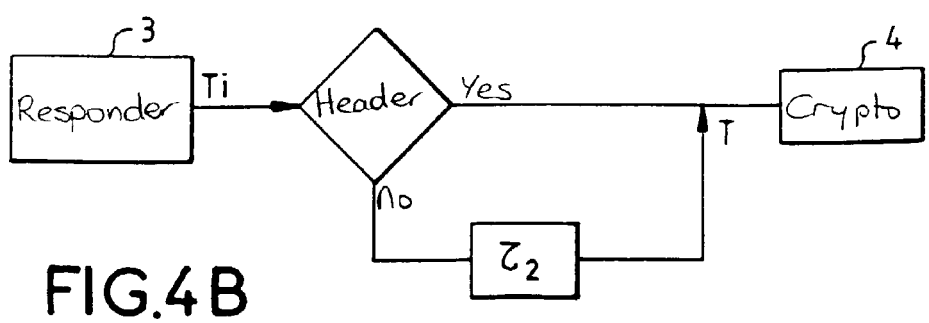

According to another embodiment of the invention, the method reduces the value of the initial time interval of the message so that a value of Ti different from the Mode 4 value is obtained FIGS. 4A and 4B respectively give a diagrammatic view of an interrogator and a responder, each equipped with an interface enabling a result of this kind to be obtained.

At the interrogator, FIG. 4B, the interrogation message in National Mode coming from the cryptography computer is converted as follows:

The string of four synchronization pulses is delayed by $\tau 2$ in order to obtain a time interval $T_2=T-\tau 2<T$ before they are transmitted to the sender part, while The pulses representing information are transmitted to the sender part without delay.

The interrogation message sent to the responder has a structure $M_2$ that differs from M by a time interval $T_2$ smaller than T. In the case of Mode 4, for example, $T_2$ is smaller than 4 µs.

The interface may be formed by an adapted software program. It may also be a piece of hardware constituted by a delay line, known to those skilled in the art, through which the pulses to be delayed flow.

At the responder, FIG. 4B, the interrogation message with the structure $M_2$ is received by the responder. It is then converted by the interface before being transmitted to the cryptographic computer.

The conversion is made as follows:

The pulses representing the header are transmitted directly, while,

The pulses associated with the information are delayed by $\tau 2$ before transmission to the cryptographic computer.

Thus, the structure of the message M is found again.

The interface is made in the form of an integrated software program in a processor or it may be a hardware delay line made according to techniques known to those skilled in the art.

Figure 5A:
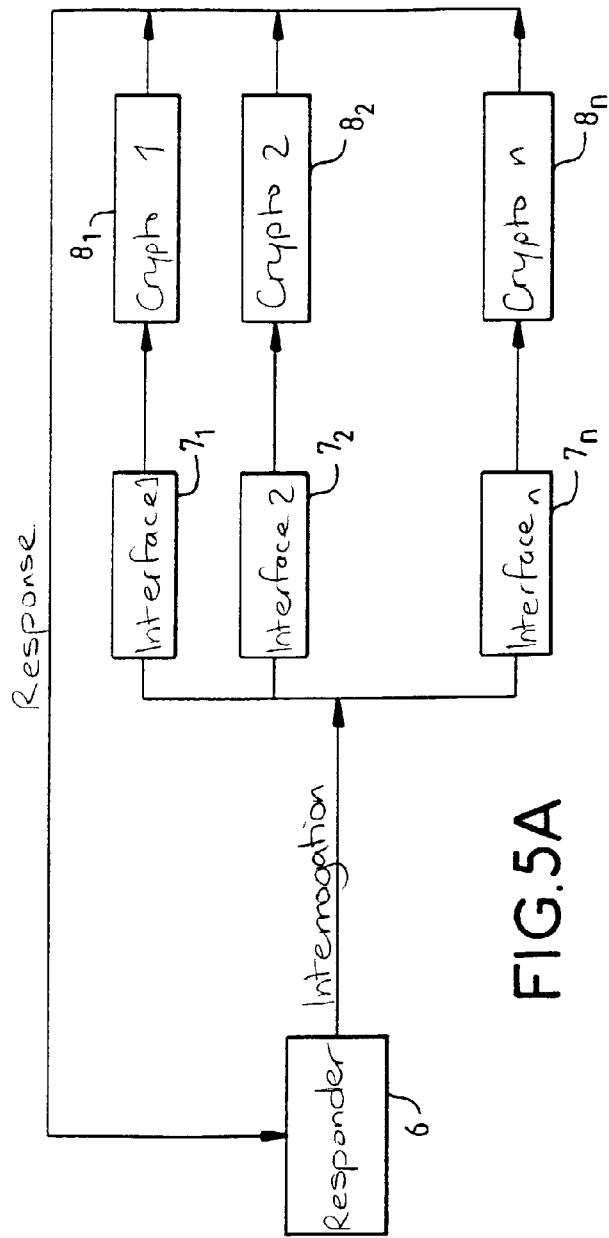
FIGS. 5A and 5B show an exemplary responder with several computers programmed with different modes.
Figure 5B:
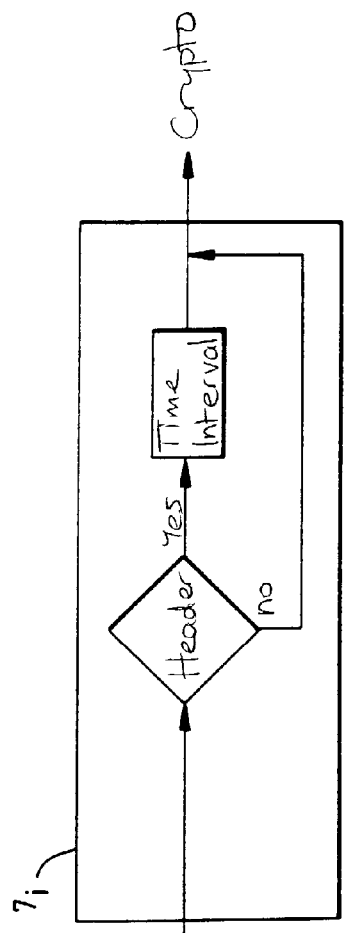

FIGS. 5A and 5B represent an exemplary responder comprising several computers programmed with different modes.

The responder 6 is connected to the different cryptographic computers $8_1, 8_2, \ldots, 8_n$ in parallel by means of the interfaces $7_1, 7_2, \ldots 7_n$.

An interface $7_i$ is described in detail in FIG. 5B. It comprises elements identical to those of FIG. 3B for example.

According to an alternative embodiment, the method generates several different values of intervals Ti for one and the same system, depending on the missions or the programming given.

Several values of Ti may be used simultaneously. To this end, at the interrogators, the processor programmed to implement the above-mentioned steps or the hardware part adapted to carry them out provides for a dynamic management of these time interval values.

Through this method, it is possible to have different non-adjoining channels while keeping the same cryptographic algorithms and the same keys. It is also possible to have a different cryptographic algorithm for each time interval.

For example, each delay has a corresponding type of interrogation. For one and the same system, it is also possible to make simultaneous use of several delays and thus increase the enciphering possibilities. The interrogators are provided with means to carry out this dynamic management of delays. The responders are either equipped to receive only one interrogation mode and provided with a corresponding interface or equipped to receive several modes. Only the cryptographic computer corresponding to the interrogation mode gives a response.

What is claimed is:

1. A method to prevent creation of disparities in an interrogation-response system programmed in a first mode, and interrogated in a second mode, the first and second mode having a same message structure but a different enciphering key, a format of a message including a header followed by an information block separated by a time interval T, the method comprising:

interfacing an interrogator or a responder to a respective cryptography computer to forward a message: and modifying the time interval T between an end of the header and a beginning of the information block into a time interval Ti different from T.

2. A method according to claim 1 wherein the initial time interval T is increased, Ti being greater than T.

3. A method according to claim 1 wherein the initial time interval T is reduced, Ti being smaller than T.

4. A method according to claim 1 further comprising: dynamically managing the values of Ti so that several first modes can be programmed.

5. An IFF system based on a Mode 4 (M4) of a National mode (NM), wherein said system is configured to prevent creation of disparities according to the method of claim 1.

6. A device to prevent generation of disparities in an IFF type system comprising at least one interrogator and at least one responder, both being provided with a cryptography computer programmed in a first mode, a National Mode, messages exchanged between an interrogator and a responder having a structure including a header and a block, the block including information, separated by a time interval T, wherein the device includes:
- an interrogator in National Mode (NM), the interrogator including at least one first interface positioned between the interrogator and a corresponding first cryptography computer, the at least one first interface configured to modify time interval T into a time interval Ti,
- a responder in National Mode (NM), the responder including at least one second interface positioned between the responder and a corresponding second cryptography computer, the at least one second interface configured to modify the time interval Ti of the received signal.

7. A device according to claim 6 wherein each interface is a software function integrated into a processor.

8. A device according to claim 6 wherein each interface is a delay line positioned between the responder or the interrogator and the corresponding cryptography computer.

9. A device according to claim 6 wherein the at least one first interface is configured to manage and generate several values of intervals Ti, the values being chosen as a function of a desired NM mode.

10. A device according to claim 8 wherein the at least one first interface is configured to use several interrogation modes simultaneously and wherein a plurality of responders are provided in association with a plurality of second interfaces that are each respectively configured to respond solely in a respective interrogation mode.

11. A device according to claim 6 wherein the corresponding first cryptography computer is programmed in Mode 4.

12. The method according to claim 1, wherein said modifying said time interval T comprises modifying a time interval between a last synchronization pulse of the header and a first pulse of the information block.

13. The device according to claim 6, wherein said at least one of said interrogator or responder is configured to modify a time interval between a last synchronization pulse of the header and a first pulse of the information block.

14. The method according to claim 1, wherein the first mode is a Mode 4 (M4) of a National Mode (NM).

* * * * *